(12) United States Patent
Yamaguchi et al.

(10) Patent No.: US 11,655,770 B2
(45) Date of Patent: May 23, 2023

(54) ENGINE

(71) Applicant: Mazda Motor Corporation, Hiroshima (JP)

(72) Inventors: Naohiro Yamaguchi, Aki-gun (JP); Mitsunori Wasada, Aki-gun (JP); Satoshi Imamura, Aki-gun (JP); Toshimasa Kotani, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/649,484

(22) Filed: Jan. 31, 2022

(65) Prior Publication Data

US 2022/0282674 A1 Sep. 8, 2022

(30) Foreign Application Priority Data

Mar. 8, 2021 (JP) .............................. JP2021-036157

(51) Int. Cl.
| | | |
|---|---|---|
| *F02D 13/02* | (2006.01) | |
| *F02B 75/20* | (2006.01) | |
| *F04D 17/10* | (2006.01) | |
| *F04D 29/42* | (2006.01) | |
| *F02B 75/18* | (2006.01) | |

(52) U.S. Cl.
CPC .......... *F02D 13/0234* (2013.01); *F02B 75/20* (2013.01); *F04D 17/10* (2013.01); *F04D 29/4206* (2013.01); *F02B 2075/1824* (2013.01)

(58) Field of Classification Search
CPC .. F02D 13/0234; F02D 15/00; F02D 41/0007; F02D 13/0219; F02D 13/0269; F02D 13/0203; F02B 75/20; F02B 2075/1824; F04D 17/10; F04D 29/4206; Y02T 10/12
See application file for complete search history.

(56) References Cited

U.S. PATENT DOCUMENTS

| | | | | |
|---|---|---|---|---|
| 2016/0363070 A1* | 12/2016 | Hotta | .................. | F02D 41/0055 |
| 2019/0360425 A1* | 11/2019 | Inoue | ....................... | F02B 1/06 |
| 2020/0191087 A1 | 6/2020 | Inoue et al. | | |
| 2020/0386170 A1* | 12/2020 | Suzuki | ................ | F02D 41/2464 |

FOREIGN PATENT DOCUMENTS

JP 201939393 A 3/2019

* cited by examiner

*Primary Examiner* — Mickey H France
*Assistant Examiner* — Edward Bushard
(74) *Attorney, Agent, or Firm* — Alleman Hall Creasman & Tuttle LLP

(57) ABSTRACT

An engine is provided, which includes an engine body including a cylinder provided with intake and exhaust ports and intake and exhaust valves, intake and exhaust passages, a turbocharger including a turbine provided to the exhaust passage and a compressor provided to the intake passage, and a variable phase mechanism configured to change open/close timings of the intake valve while maintaining an open period of the intake valve at a 270° C.A or larger. A geometric compression ratio of the cylinder is 11:1 or higher. In a high-load range, the variable phase mechanism sets the intake valve close timing to be after an intake BDC and to make a ratio of a retarded amount of the intake closing to the geometric compression ratio be 4.58 or above and 6.67 or below, and sets the intake valve open timing to be before a close timing of the exhaust valve.

15 Claims, 7 Drawing Sheets

ENGINE

TECHNICAL FIELD

The present disclosure relates to an engine provided with an engine body including a cylinder, an intake passage and an exhaust passage connected to the engine body, and a turbocharger including a turbine provided to the exhaust passage and a compressor provided to the intake passage. The engine body includes an intake port, an exhaust port, an intake valve, and an exhaust valve, which are provided to the cylinder.

BACKGROUND OF THE DISCLOSURE

In engines mounted on, for example, automobiles, a booster is provided to boost intake air in order to improve the output performance. For example, JP2019-039393A discloses an engine provided with a mechanical supercharger which is driven by an engine body.

As a configuration to improve the fuel efficiency of an engine, it is considered to set a geometric compression ratio of a cylinder higher. Therefore, when a booster is provided to the engine with a comparatively high geometric compression ratio of the cylinder, fuel efficiency can be improved while the engine output is increased. However, when this configuration is simply adopted, abnormal combustion easily occurs.

For example, when an engine load and the temperature inside the cylinder are high, by mixture gas (containing intake air boosted by the booster) at the high temperature and pressure being excessively compressed, preignition and knocking may be caused.

SUMMARY OF THE DISCLOSURE

The present disclosure is made in view of the above situations, and one purpose thereof is to provide an engine, capable of suppressing an occurrence of abnormal combustion while increasing fuel efficiency.

According to one aspect of the present disclosure, an engine is provided, which includes an engine body including a cylinder provided with an intake port, an exhaust port, an intake valve, and an exhaust valve, an intake passage and an exhaust passage connected to the engine body, a turbocharger including a turbine provided to the exhaust passage and a compressor provided to the intake passage, and an variable phase mechanism configured to change an open timing and a close timing of the intake valve while maintaining an open period of the intake valve at a given range of 270° or larger by a crank angle. A geometric compression ratio of the cylinder is 11:1 or higher. In a high-load range where an engine load is above a given reference load, the variable phase mechanism sets the close timing of the intake valve to be after an intake bottom dead center and to make a ratio of a retarded amount of intake closing with respect to the geometric compression ratio of the cylinder be 4.58 or above and 6.67 or below, and sets the open timing of the intake valve to be before a close timing of the exhaust valve, the retarded amount of the intake closing being a crank angle from the intake bottom dead center to the close timing of the intake valve.

According to this structure, since the geometric compression ratio of the cylinder is set to be high (11:1 or higher), and the turbocharger is provided to the engine, the fuel efficiency is improved while increasing the output of the engine. In addition, the open period of the intake valve is set to be long (the range of 270° or larger in crank angle), and the intake valve is configured to close at the timing described above in the high-load range. Thus, it becomes possible to suppress the occurrence of abnormal combustion.

Specifically, since the intake valve is configured to close after an intake bottom dead center in the high-load range, an effective compression ratio of the cylinder is lowered and the occurrence of preignition and knocking can be suppressed. Further, the open period of the intake valve is set to be long (the range of 270° or larger in crank angle) so that the intake valve closes after the intake bottom dead center while the open timing of the intake valve is set to be comparatively early, and also the intake valve is configured to open before the exhaust valve closes in the high-load range. That is, in the high-load range, while the close timing of the intake valve is set to be after the intake bottom dead center, an overlap period during which the intake valve and the exhaust valve are both open for a given period near an exhaust top dead center is established. Thus, as well as lowering the effective compression ratio of the cylinder, the scavenging performance of the cylinder is improved so that an amount of burnt gas at a high temperature remaining in the cylinder is reduced, and therefore, the occurrence of knocking can be suppressed.

In addition, according to the knowledge of the present inventors, in the engine provided with the turbocharger where the geometric compression ratio of the cylinder is 11:1 or higher and the open period of the intake valve is set to 270° or larger in crank angle, it is revealed that if the intake valve is closed at a timing at which the ratio of the retarded amount of intake closing (the crank angle from the intake bottom dead center to the close timing of the intake valve) with respect to the geometric compression ratio of the cylinder becomes 4.58 or above and 6.67 or below, the occurrence of knocking can securely be suppressed while fuel efficiency is improved. In this regard, in this configuration, the intake valve is configured to close such that the aforementioned ratio becomes 4.58 or above and 6.67 or below. Therefore, the occurrence of abnormal combustion (e.g., preignition and knocking) can be suppressed securely while fuel efficiency is certainly improved.

Here, it is revealed that when the ratio of the retarded amount of intake closing with respect to the geometric compression ratio of the cylinder is set to be in a range of 5.0 or above and 6.25 or below, within the range of 4.58 or above and 6.67 or below, the fuel efficiency is improved more securely.

Thus, in the high-load range, the variable phase mechanism may set the close timing of the intake valve such that the ratio of the retarded amount of the intake closing with respect to the geometric compression ratio of the cylinder is 5.0 or above and 6.25 or below.

The cylinder may be one of a plurality of cylinders provided to the engine body, each cylinder including a respective exhaust port. The exhaust passage may include a plurality of independent exhaust passages, each communicating with the exhaust port of one cylinder or the exhaust ports of two or more cylinders of which timings of exhaust strokes are discontinuous from each other. The turbine may include a turbine body having a plurality of blades configured to rotate by receiving exhaust energy, and a turbine housing configured to accommodate the turbine body. An internal space of the turbine housing may be partitioned, at a part from an upstream end of the turbine housing to the turbine body, into a plurality of inlet passages lined up in a direction of a rotation axis of the turbine body and formed to extend along an outer circumference of the turbine body.

The plurality of independent exhaust passages may be connected to different inlet passages, respectively.

According to this structure, exhaust interference between the independent exhaust passages (i.e., between the cylinders where exhaust strokes take place consecutively) can be suppressed. Therefore, the scavenging performance of each cylinder is improved more, and the occurrence of knocking can be suppressed more securely.

The open period of the intake valve may be a range of 270° or larger and 290° or smaller in crank angle.

The engine may be a straight-six engine having six cylinders lined up in a row.

An upstream part of the exhaust passage may be branched into a first independent exhaust passage and a second independent exhaust passage, and a cylinder head may be formed with a first in-head exhaust passage and a second in-head exhaust passage each extending in a lined-up direction of the cylinders. When the six cylinders include a first cylinder, a second cylinder, a third cylinder, a fourth cylinder, a fifth cylinder, and a sixth cylinder in this order from a first side to a second side in the lined-up direction, the first in-head exhaust passage may communicate with the exhaust ports of the first cylinder, the second cylinder, and the third cylinder located on the first side in the lined-up direction, and the exhaust ports of the first, the second, and the third cylinders may be collected at the first in-head exhaust passage to be connected to the first independent exhaust passage. The second in-head exhaust passage may communicate with the exhaust ports of the fourth cylinder, the fifth cylinder, and the sixth cylinder located on the second side, and the exhaust ports of the fourth, the fifth, and the sixth cylinders may be collected at the second in-head exhaust passage to be connected to the second independent exhaust passage.

The turbine may be a twin-scroll turbine to which the first independent exhaust passage and the second independent exhaust passage are independently connected. The turbocharger may be provided with a first inlet passage provided on a first side in a direction of a rotation axis of the turbine, and a second inlet passage provided on a second side. The first independent exhaust passage may be connected to the first inlet passage, and the second independent exhaust passage may be connected to the second inlet passage.

DETAILED DESCRIPTION OF THE DISCLOSURE

Hereinafter, one preferable embodiment of the present disclosure is described in detail with reference to the accompanying drawings.

(Overall Configuration of Engine)

Figure 1:
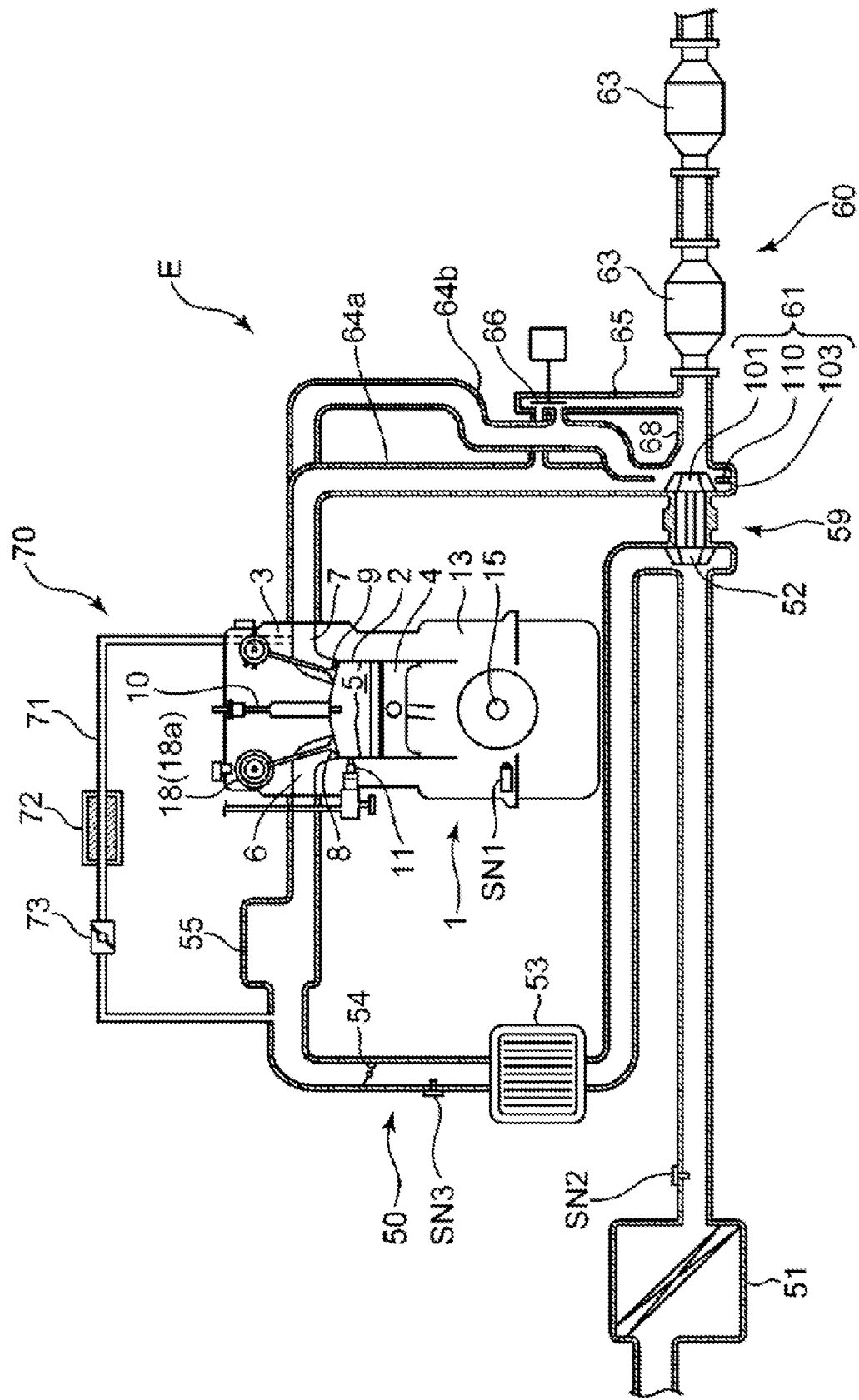
FIG. 1 is a schematic configuration diagram illustrating an engine according to one embodiment of the present disclosure.
Figure 2:
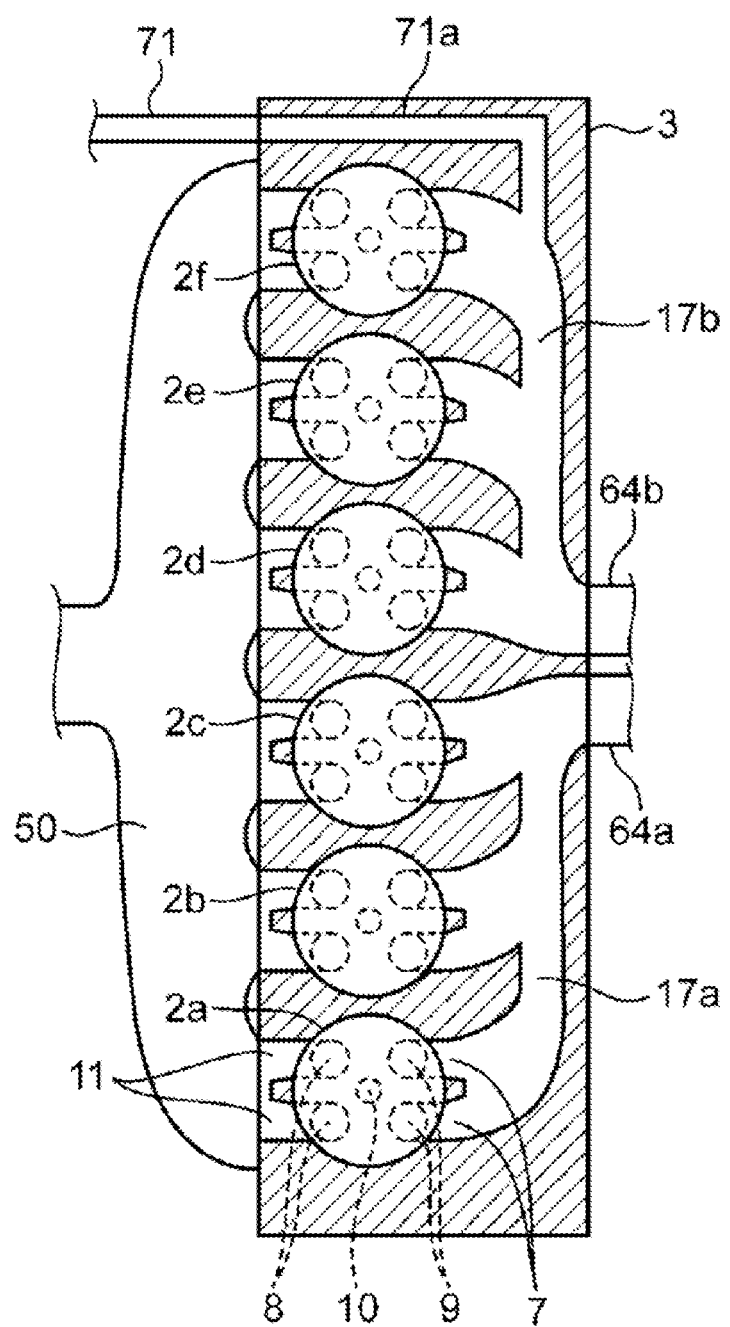
FIG. 2 is a schematic cross-sectional view of a cylinder head.

FIG. 1 is a schematic configuration diagram illustrating an engine E according to one embodiment of the present disclosure. Note that FIG. 1 is a schematic view which illustrates the configuration of the engine E, and the length of each passage and an arrangement of each device are different from the actual configuration. FIG. 2 is a schematic cross-sectional view of a cylinder head 3 (described later). The engine E is provided with a four-stroke engine body 1, an intake passage 50 through which air (intake air) to be introduced into the engine body 1 passes, and an exhaust passage 60 through which exhaust gas discharged from the engine body 1 passes. The engine E is a multi-cylinder engine having a plurality of cylinders 2 formed in the engine body 1. In this embodiment, as illustrated in FIG. 2, the engine body 1 is a straight-six engine having six cylinders 2 lined up in a row. The engine E is mounted on a vehicle, for example, as a drive source of the vehicle.

The engine E is a boosted engine having a turbocharger 59. The turbocharger 59 includes a turbine 61 provided to the exhaust passage 60 and a compressor 52 provided to the intake passage 50. The turbine 61 is rotary driven by exhaust gas, and rotary drives the compressor 52. When the compressor 52 is rotary driven, intake air inside the intake passage 50 is boosted. Note that FIG. 1 is a schematic view as described above, and the turbocharger 59 is disposed at a position near a side surface of the engine body 1.

The engine body 1 includes a cylinder block 13 in which the cylinders 2 are formed, the cylinder head 3 covering the cylinder block 13, and pistons 4 reciprocatably inserted into the respective cylinders 2. Each piston 4 is coupled to a crankshaft 15 via a connecting rod, and the crankshaft 15 rotates about its center axis according to the reciprocation of the piston 4. A combustion chamber 5 is defined above the piston 4.

A geometric compression ratio $\varepsilon$ of a cylinder $2a$ is a ratio of a volume V0 of the combustion chamber 5 when the piston 4 is at a top dead center (when located closest to the cylinder head 3), to a volume V1 of the combustion chamber 5 when the piston 4 is at a bottom dead center (when located farthest from the cylinder head 3) ($\varepsilon$=V0/V1), and is set to be 11:1 or higher. In this embodiment, the geometric compression ratio $\varepsilon$ of the cylinder 2 is set at 12:1.

An injector 11 which injects fuel into each combustion chamber 5 is attached to the cylinder block 13. To the cylinder head 3, a spark plug 10 which ignites a mixture gas (mixture gas of fuel and air) inside each combustion chamber 5 by spark discharge is attached. The cylinder head 3 is provided with an intake port 6 which introduces air into the combustion chamber 5 of each cylinder 2, an intake valve 8 which opens and closes the intake port 6, an exhaust port 7 which discharges exhaust gas generated inside the combustion chamber 5 of each cylinder 2, and an exhaust valve 9 which opens and closes the exhaust port 7.

A valve mechanism 18 which drives the intake valve 8 is built-in with an intake S-VT 18a which is changeable of open and close timings of the intake valve 8. Similarly, a valve mechanism 19 for the exhaust valve 9 is built-in with an exhaust S-VT 19a which is changeable of open and close timings of the exhaust valve 9. The intake S-VT 18a (exhaust S-VT 19a) is a so-called variable phase mechanism, and changes an open timing IVO (EVO) and a close timing IVC (EVC) of the intake valve 8 (exhaust valve 9) simultaneously by the same amount. That is, the open timing IVO (EVO) and the close timing IVC (EVC) of the intake valve 8 (exhaust valve 9) are changed while a valve open period is maintained to be constant. In this embodiment, the open period of the intake valve 8 is maintained to be 270° C.A (Crank Angle), and the open period of the exhaust valve 9 is maintained to be 250° C.A.

The intake passage 50 is provided, in an order from upstream, with an air cleaner 51, the compressor 52, an intercooler 53, a throttle valve 54, and a surge tank 55. Air compressed by the compressor 52 and then cooled by the intercooler 53 is introduced into the combustion chamber 5. The throttle valve 54 is a valve which is openable and closable of the intake passage 50, and an amount of intake air passing through the intake passage 50 can be controlled according to an opening of the throttle valve 54.

The exhaust passage 60 is provided, in an order from upstream, with the turbine 61, and a catalytic converter 63 built-in with a catalyst (e.g., a three-way catalyst). Detailed structures of the turbine 61 and a flow passage for the exhaust gas from each cylinder 2 to the turbine 61 will be described later.

The exhaust passage 60 is provided with a bypass passage 65 for bypassing the turbine 61. A downstream end of the bypass passage 65 is connected to part of a downstream-side exhaust passage 68 between the turbine 61 and the catalytic converter 63. An upstream end of the bypass passage 65 is branched into two passages, and the branched passages are connected to two independent exhaust passages 64a and 64b (described later), respectively. The bypass passage 65 is provided with a wastegate valve 66 which opens and closes the bypass passage 65. In the example of FIG. 1, the branched passages are simultaneously opened and closed by a single wastegate valve 66.

The engine E is provided with an exhaust gas recirculation (EGR) device 70 which recirculates a part of exhaust gas to intake gas. The EGR device 70 includes an EGR passage 71 through which exhaust gas passes, an EGR cooler 72 which cools EGR gas passing through the EGR passage 71, and an EGR valve 73 which opens and closes the EGR passage 71. In this embodiment, as illustrated in FIG. 2, an in-head EGR passage 71a which constitutes an upstream-end part of the EGR passage 71 is formed in the cylinder head 3. This in-head EGR passage 71a is communicated with a passage which is a second in-head exhaust passage 17b (described later) formed in the cylinder head 3 and through which exhaust gas passes, and part of the exhaust gas passing through the second in-head exhaust passage 17b recirculates to the intake passage 50 as the EGR gas.

The engine E is provided with various sensors. For example, the cylinder block 13 is provided with a crank-angle sensor SN1 which detects a rotational angle of the crankshaft 15 (i.e., an engine speed). Moreover, at a part of the intake passage 50 between the air cleaner 51 and the compressor 52, an airflow sensor SN2 which detects a flow rate of intake air passing through this part to be introduced into each cylinder 2 is provided. Further, at a part of the intake passage 50 between the intercooler 53 and the throttle valve 54, and on the downstream side of the compressor 52, a boost-pressure sensor SN3 which detects the boost pressure (i.e., the pressure of intake air passing through this part) is provided.

(Turbine 61 and Flow Passage for Exhaust Gas)

Figure 4:
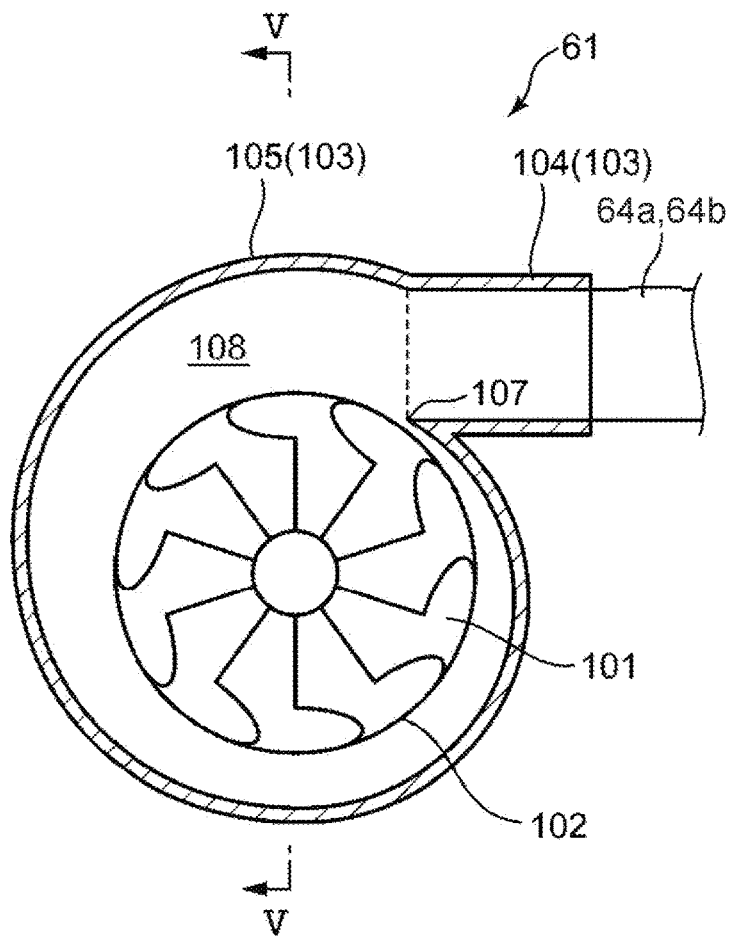
FIG. 4 is a schematic cross-sectional view of a turbine.
Figure 5:
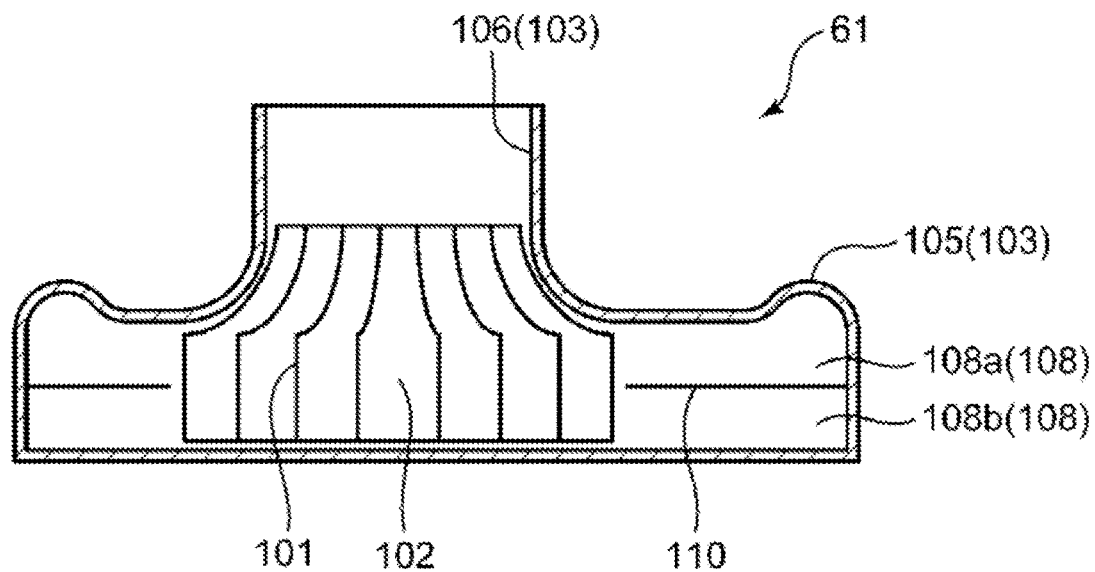
FIG. 5 is a cross-sectional view taken along a line V-V of FIG. 4.

Next, structures of the turbine 61 and the flow passage for exhaust gas from each cylinder 2 to the turbine 61 are described. FIG. 4 is a schematic cross-sectional view of the turbine 61 along a plane perpendicular to a rotation axis of the turbine 61. FIG. 5 is a schematic cross-sectional view taken along a line V-V of FIG. 4.

As illustrated in FIG. 1, in this embodiment, the upstream part of the exhaust passage 60 is branched into two passages, and the exhaust passage 60 includes the first independent exhaust passage 64a and the second independent exhaust passage 64b which constitute the upstream part. Exhaust gas discharged from the cylinders 2 of which timings of exhaust strokes are not continuous from each other, is introduced into each of the independent exhaust passages 64a and 64b. In this embodiment, the exhaust ports 7 of the cylinders 2 where exhaust strokes do not take place consecutively, are collected in the cylinder head 3, and each collected part is connected to the independent exhaust passage 64a or 64b.

For example, in the cylinder head 3, a first in-head exhaust passage 17a and the second in-head exhaust passage 17b each extending in the lined-up direction of the cylinders 2 are formed. Suppose that the six cylinders 2 are, from a first side in the lined-up direction, a first cylinder 2a, a second cylinder 2b, a third cylinder 2c, a fourth cylinder 2d, a fifth cylinder 2e, and a sixth cylinder 2f. The first in-head exhaust passage 17a is communicated with the exhaust ports 7 of the three cylinders 2 located on the first side in the lined-up direction of the cylinders 2 (i.e., the first cylinder 2a, the second cylinder 2b, and the third cylinder 2c), and the exhaust ports 7 of the cylinders 2a, 2b, and 2c are collected at the first in-head exhaust passage 17a. On the other hand, the second in-head exhaust passage 17b is communicated with the exhaust ports 7 of the three cylinders 2 located on a second side in the lined-up direction of the cylinders 2 (i.e., the fourth cylinder 2d, the fifth cylinder 2e, and the sixth cylinder 2f), and the exhaust ports 7 of the cylinders 2d, 2e, and 2f are collected at the second in-head exhaust passage 17b. Each of the first in-head exhaust passage 17a and the second in-head exhaust passage 17b individually opens to the side surface of the engine body 1. The first in-head exhaust passage 17a is connected to and communicated with the opening of the first independent exhaust passage 64a, and the second in-head exhaust passage 17b is connected to and communicated with the opening of the second independent exhaust passage 64b.

An order of ignitions in the six cylinders 2 (an order of combustions of the mixture gas inside the cylinders 2) is set to be the first cylinder 2a, the fifth cylinder 2e, the third cylinder 2c, the sixth cylinder 2f, the second cylinder 2b, and then the fourth cylinder 2d, and thus, exhaust strokes also take place consecutively in this order. Accordingly, the timings of exhaust strokes of the first cylinder 2a, the second cylinder 2b, and the third cylinder 2c which communicate with the first in-head exhaust passage 17a are discontinuous from each other, and exhaust gas discharged from the cylinders 2 where exhaust strokes do not take place consecutively (in other words, the timings of exhaust strokes are discontinuous from each other), is introduced into the first independent exhaust passage 64a. Similarly, the timings of exhaust strokes of the fourth cylinder 2d, the fifth cylinder 2e, and the sixth cylinder 2f are discontinuous from each other, and exhaust gas discharged from the cylinders 2 where exhaust strokes do not take place consecutively, is introduced into the second independent exhaust passage 64b.

The turbine 61 is a twin-scroll turbine, and the first independent exhaust passage 64a and the second independent exhaust passage 64b are independently connected to the turbine 61.

For example, the turbine 61 is a radial turbine, and includes a turbine body (i.e., a turbine impeller) 102 which has a plurality of blades 101 at its outer circumference and rotates by exhaust gas colliding with the blades 101, and a turbine housing 103 which accommodates the turbine body 102. The turbine housing 103 includes an inlet part 104 which inwardly introduces exhaust gas, a turbine scroll part 105 which extends along the outer circumference of the turbine body 102 from a downstream end of the inlet part 104, and surrounds the entire circumference of the turbine body 102, and an outlet part 106 which discharges the expanded exhaust gas in the turbine body 102 to the downstream side. The turbine scroll part 105 is provided, at its downstream end, with a tongue part 107 which projects toward the turbine body 102 and partitions the inlet part 104 from the downstream part of the turbine scroll part 105. The turbine scroll part 105 has a spiral shape, and a cross-sectional channel area thereof becomes smaller toward the tongue part 107 at the downstream side.

Inside a part of the turbine housing 103 comprised of the inlet part 104 and the turbine scroll part 105, a partition 110 is provided to be located at substantially the center of the turbine 61 in a direction of the rotation axis of the turbine 61 (turbine body 102) and extend along the outer circumference of the turbine housing 103. By the partition 110, a part of the turbine housing 103 comprised of the inlet part 104 and the turbine scroll part 105 (i.e., an internal space from the upstream end of the turbine housing 103 to the turbine body 102 in the flowing direction of the exhaust gas) is partitioned into two inlet passages 108 aligned in the rotation-axis direction of the turbine 61 (turbine body 102) and each extending along the outer circumference of the turbine body 102. That is, the internal space is provided with a first inlet passage 108a provided on a first side in the rotation-axis direction of the turbine 61, and a second inlet passage 108b provided on a second side. The inlet passages 108a and 108b are formed mutually independently over the substantially entire circumference of the turbine body 102.

The first independent exhaust passage 64a and the second independent exhaust passage 64b are connected to the two inlet passages 108a and 108b, respectively. That is, the first independent exhaust passage 64a is connected to the first inlet passage 108a, and the second independent exhaust passage 64b is connected to the second inlet passage 108b.

According to this configuration, between the two cylinders 2 where exhaust strokes are carried out consecutively, exhaust gas discharged from the two cylinders 2 passes through the mutually independent passages to reach the turbine body 102. Note that a sole downstream-side exhaust passage 68 which constitutes the downstream part of the exhaust passage 60 is connected to the outlet part 106 of the turbine 61, and the exhaust gas introduced into the turbine housing 103 from the independent exhaust passages 64a and 64b is introduced into the common downstream-side exhaust passage 68 after passing through the turbine body 102.

(Control System)

Figure 3:
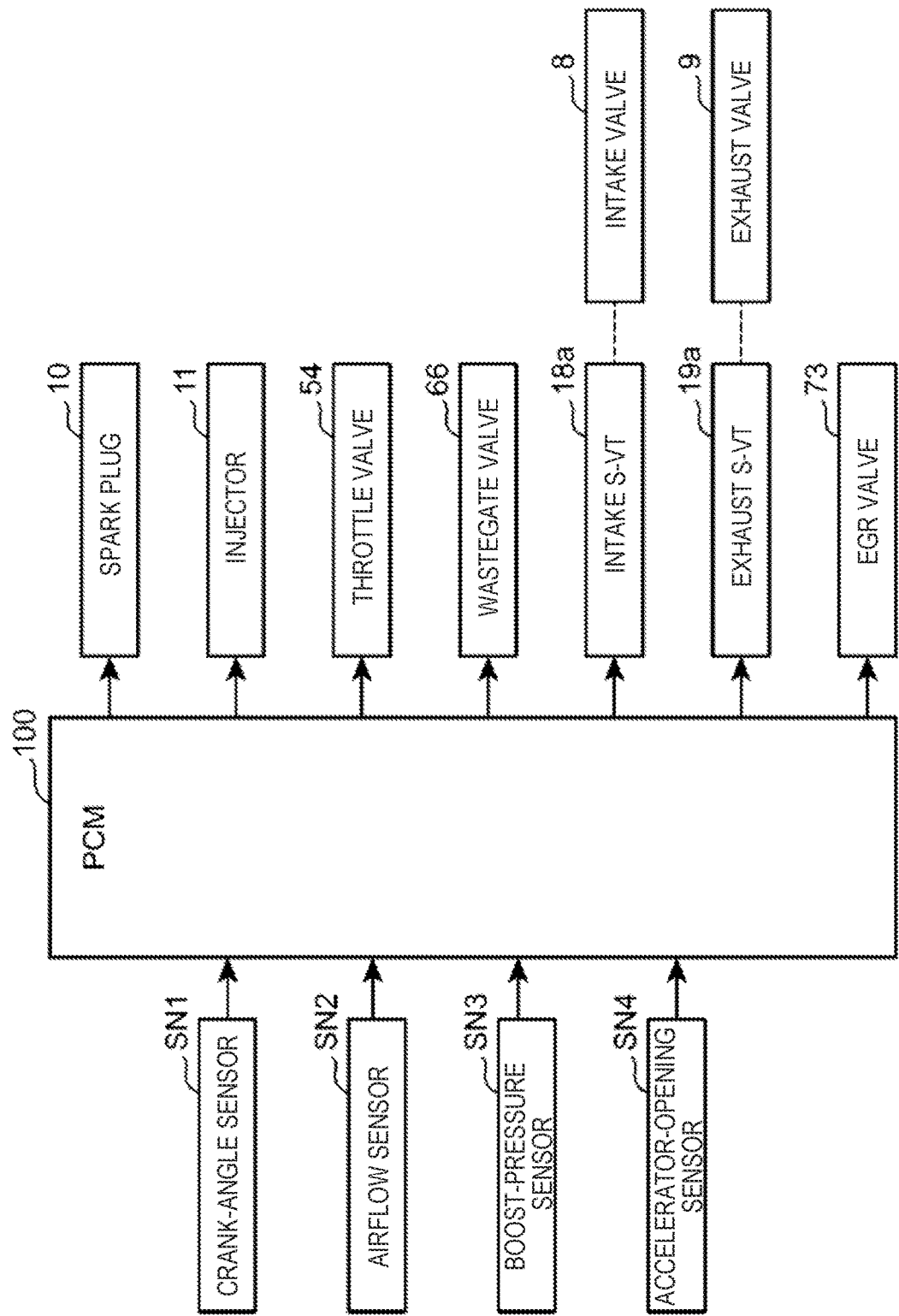
FIG. 3 is a block diagram illustrating a control system of the engine.

FIG. 3 is a block diagram illustrating a control system of the engine E. Each actuator of the engine E configured as described above is controlled by a powertrain control module (PCM) 100. The PCM 100 illustrated in this diagram is a microcomputer which integrally controls the engine, etc., and is comprised of a well-known processor (e.g., a central processing unit (CPU)), memory (e.g., ROM and/or RAM), etc.

The PCM 100 receives inputs of detection signals of the various sensors. For example, the PCM 100 is electrically connected to the crank-angle sensor SN1, the airflow sensor SN2, and the boost-pressure sensor SN3, and information detected by these sensors are sequentially inputted into the PCM 100. Further, the vehicle on which the engine E is mounted is provided with an accelerator-opening sensor SN4 which detects a depressed amount (position) of an accelerator pedal which is operated by a driver who drives the vehicle, and information detected by the accelerator-opening sensor SN4 is also sequentially inputted into the PCM 100.

The PCM 100 controls each part of the engine E while executing, for example, various determinations and calculations based on the information inputted from each sensor. In detail, the PCM 100 is electrically connected to, for example, the spark plug 10, the injector 11, the throttle valve 54, the wastegate valve 66 (described later), the intake S-VT 18a, the exhaust S-VT 19a, and the EGR valve 73, and outputs a control signal to each of the devices based on a result of the calculations, etc.

The PCM 100 controls the spark plug 10 to ignite the mixture gas at an ignition timing set for each operation condition, controls the injector 11 to inject fuel into the cylinder 2 based on setting for each operation condition, and controls the throttle valve 54 to introduce intake air into the cylinder 2 by an amount set for each operation condition. Further, the PCM 100 controls the opening of the wastegate valve 66 so that the boost pressure becomes a value set for each operation condition, and controls the EGR valve 73 so that an EGR ratio inside the cylinder 2 becomes a value set for each operation condition. Moreover, the PCM 100 controls the intake S-VT 18a and the exhaust S-VT 19a so that the intake valve 8 and the exhaust valve 9 open and close at timings set for each operation condition, respectively.

(Open and Close Timings of Intake and Exhaust Valves in Low-Speed and High-Load Range)

Figure 6:
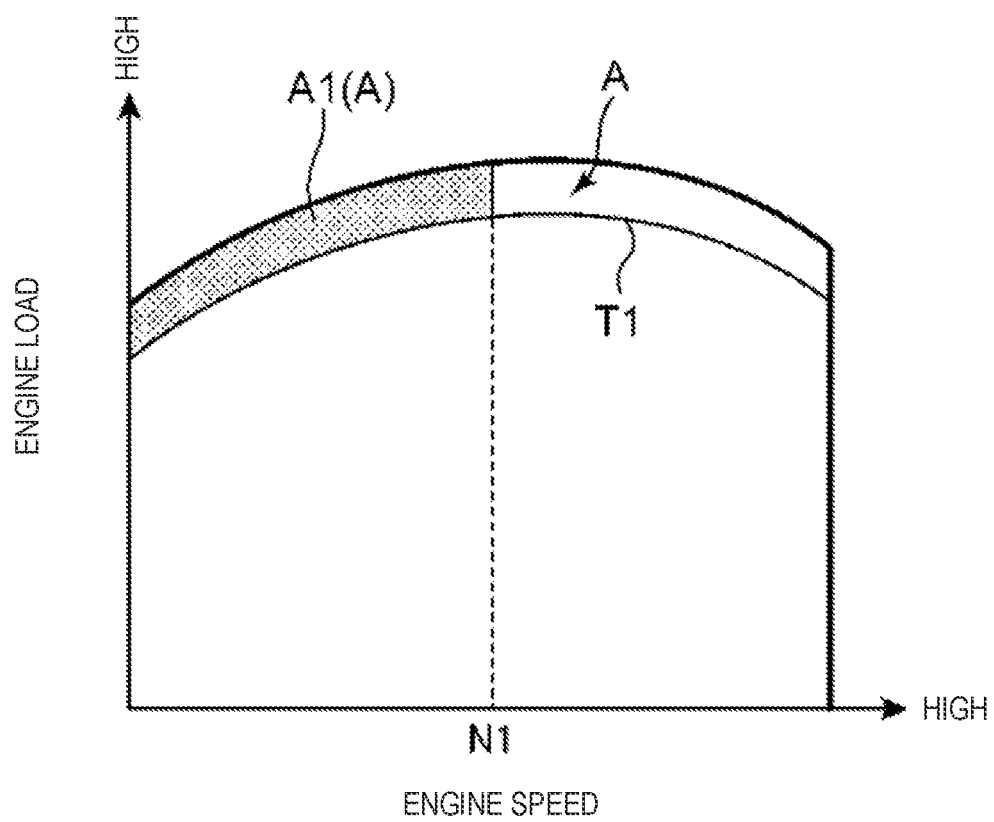
FIG. 6 is a map illustrating operation ranges of the engine.

FIG. 6 is a map illustrating operation ranges of the engine, where the horizontal axis indicates the engine speed and the vertical axis indicates the engine load. Below, controls of the intake valve 8 and the exhaust valve 9 (controls of the intake S-VT 18a and the exhaust S-VT 19a) in a low-speed and high-load range μl illustrated in FIG. 6 is described, in which the engine speed is below a given reference speed N1 within a high-load range A where the engine load is above a given reference load T1. The reference speed N1 is set to about 1,500 rpm, and the reference load T1 is set to near the maximum value of the engine load (i.e., near the full load).

Figure 7:
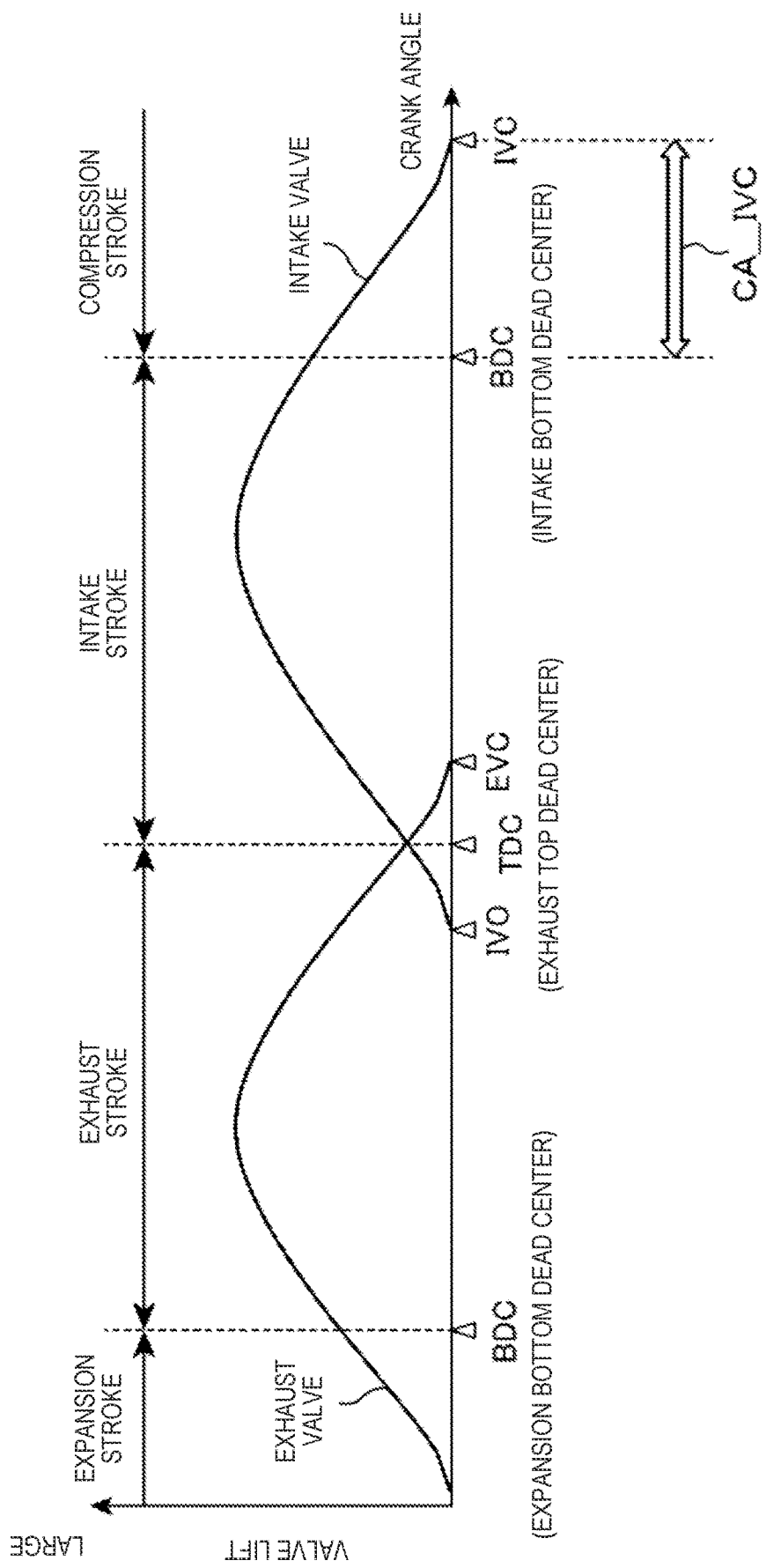
FIG. 7 is a view schematically illustrating valve lifts of an intake valve and an exhaust valve.

FIG. 7 is a view schematically illustrating valve lifts in the low-speed and high-load range μl. As illustrated in FIG. 7, in the low-speed and high-load range μl, the PCM 100 controls the intake S-VT 18a so that the intake valve 8 closes at a timing later than an intake bottom dead center (BDC), that is, the intake-valve close timing IVC is retarded from the intake BDC.

In the low-speed and high-load range μl, the intake-valve close timing IVC is retarded from the intake BDC in order to prevent the occurrence of abnormal combustion.

For example, in this embodiment, since the geometric compression ratio ε of the cylinder 2 is 12:1 and the turbocharger 59 is provided, the pressure inside the cylinder 2 is likely to increase during the compression. Therefore, in the range where the engine load is high and a large amount of intake air is introduced into the cylinder 2, and the in-cylinder temperature and pressure before the compression are accordingly high, like in the low-speed and high-load range μl, preignition in which the mixture gas self-ignites before the spark plug 10 ignites the mixture gas easily occurs. Moreover, it is known that, in the engine with the turbocharger, knocking easily occurs within a range where the engine speed is low and the engine load is high. That is, after the mixture gas is ignited by the spark plug 10 and starts combustion, a part where the temperature and pressure are locally high is generated inside the cylinder 2, and thus, the mixture gas is likely to self-ignite before the flame propagation, which rapidly increases the pressure.

In this respect, when the intake-valve close timing IVC is retarded from the intake BDC as described above, the effective compression ratio of the cylinder 2 is decreased, and thereby, the in-cylinder gas can be prevented from being excessively compressed. As a result, the occurrence of preignition can be reduced. Moreover, since the temperature and pressure inside the cylinder 2 at the start timing of the combustion can be kept at low, the occurrence of knocking can be reduced.

Here, the temperature and pressure inside the cylinder 2 become lower as the effective compression ratio decreases. Therefore, it is considered to be desirable to reduce the effective compression ratio in order to lower a probability of occurrence of the preignition and knocking. However, the present inventors found that when the effective compression ratio is reduced to some extent, the probability of the occurrence of knocking increases. This is considered to occur because, when the intake-valve close timing IVC is retarded to reduce the effective compression ratio, the intake-valve open timing IVO is also retarded, which shortens a valve overlap period during which both of the intake valve 8 and the exhaust valve 9 open. For example, even if the effective compression ratio is reduced, when the valve overlap during which the intake valve 8 and the exhaust valve 9 both open is not provided, or the valve overlap period is short, a scavenging performance of the cylinder 2 degrades and an amount of burnt gas at a high temperature remaining in the cylinder 2 increases. As a result, since the in-cylinder temperature is not sufficiently lowered, the generation of a part where the temperature and pressure are locally high is not suppressed, and therefore knocking easily occurs.

Therefore, in this embodiment, as illustrated in FIG. 7, the PCM 100 controls the intake S-VT 18a and the exhaust S-VT 19a in the low-speed and high-load range μl so as to achieve the valve overlap during which the intake valve 8 and the exhaust valve 9 both open for a given period of time having an exhaust top dead center (TDC) therebetween. That is, the PCM 100 controls the intake S-VT 18a so that the open timing of the intake valve 8 (intake-valve open timing) IVO becomes an advanced timing from the exhaust TDC, and controls the exhaust S-VT 19a so that the close timing of the exhaust valve 9 (exhaust-valve close timing) EVC becomes a retarded timing from the exhaust TDC.

Here, if the open period of the intake valve 8 is a range of 180° C.A or smaller, it is impossible to set the intake-valve open timing IVO at the advanced side of the exhaust TDC, and set the intake-valve close timing IVC at the retarded side of the intake BDC. On the other hand, in this embodiment, the intake-valve open period is set to be sufficiently longer than 180° C.A, at 270° C.A as described above. Therefore, it is possible to set the intake-valve open timing IVO at the advanced side of the exhaust TDC, and set the intake-valve close timing IVC at the retarded side of the intake BDC.

Moreover, the present inventors found that, in the configuration where the valve overlap is provided and the intake-valve close timing IVC is retarded from the intake BDC, an optimal range exists for a ratio of a retarded amount of intake closing CA_IVC with respect to the geometric compression ratio ε of the cylinder 2, in terms of suppressing knocking and improving the fuel efficiency. The retarded amount of intake closing CA_IVC is a crank angle from the intake BDC to the intake-valve close timing IVC. Below, the ratio of the retarded amount of intake closing CA_IVC to the geometric compression ratio ε of the cylinder 2 is referred to as the "intake retarding to compression ratio R" (R=CA_IVC/ε).

Figure 8:
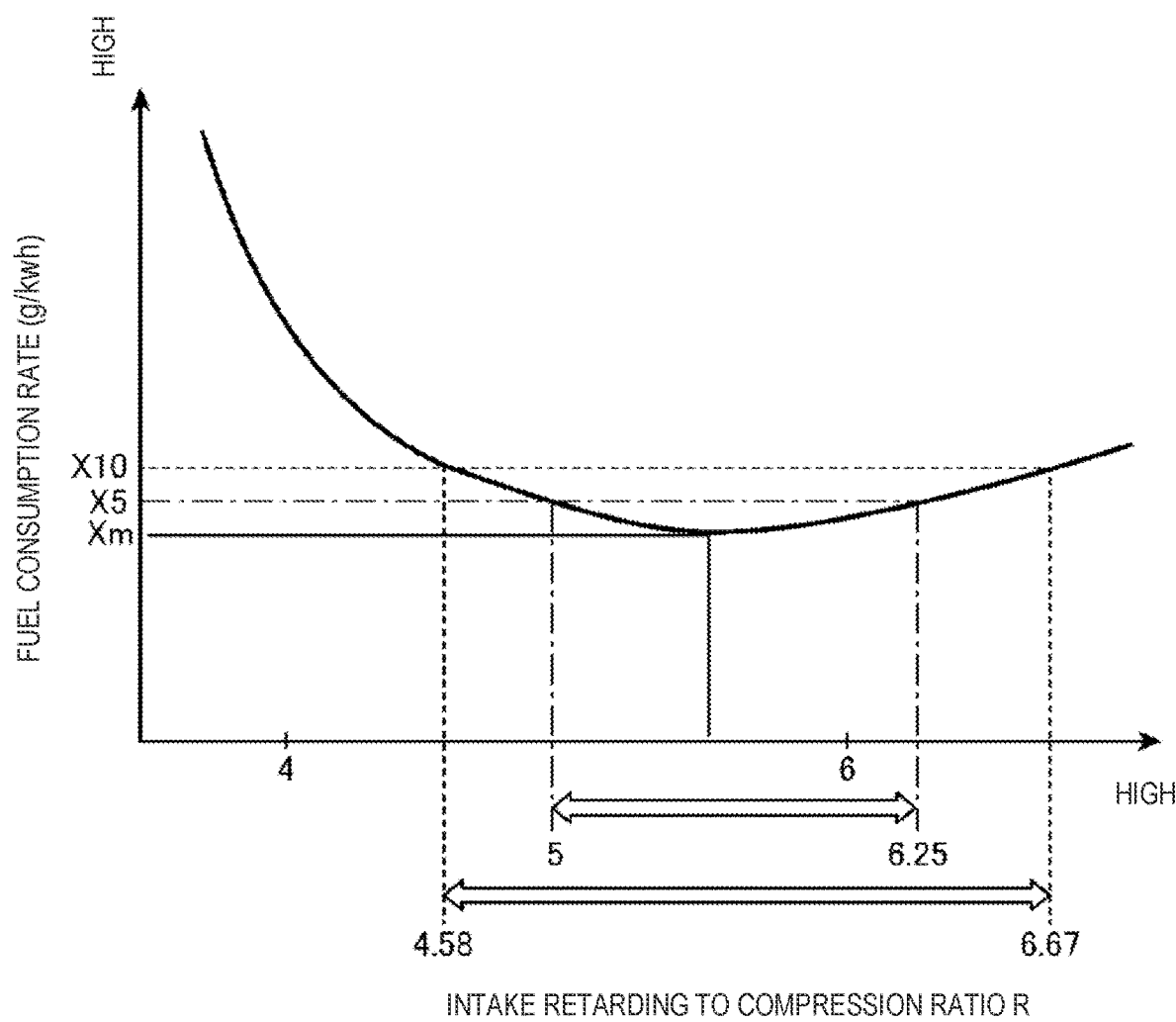
FIG. 8 is a graph illustrating a relationship between an intake retarding ratio to a compression ratio, and a fuel consumption rate.

In detail, as a result of various experiments, it became apparent that a relationship between the intake retarding to compression ratio R, and a fuel consumption rate (a weight of consumed fuel with respect to the engine output) is as illustrated in a graph of FIG. 8. Note that the graph in FIG. 8 illustrates a result of the experiment conducted under the conditions that the geometric compression ratio ε of the cylinder 2 is 11:1 or higher, the engine is provided with the turbocharger, and the engine is operated in the low-speed and high-load range μl. Moreover, the fuel consumption rate illustrated in the graph of FIG. 8 is a fuel consumption rate when the ignition timing is advanced to the most and a timing of a combustion center of gravity is advanced to the most within a range where knocking is not caused, and is the minimum possible value of the fuel consumption rate within the range where knocking is not caused.

Based on the graph in FIG. 8, it is apparent that the fuel consumption rate becomes a minimum valve Xm when the intake retarding to compression ratio R is near 5.5, and the fuel consumption rate increases as the intake retarding to compression ratio R becomes smaller or larger than 5.5. Moreover, when the intake retarding to compression ratio R is 4.58 or above and 6.67 or below, the fuel consumption rate becomes 1% or less larger than the minimum value Xm (i.e., at or below a value X10 obtained by multiplying the minimum value Xm by 1.01). Further, when the intake retarding to compression ratio R is 5.0 or above and 6.25 or below, the fuel consumption rate becomes 0.5% or less larger than the minimum value Xm (i.e., at or below a value X5 obtained by multiplying the minimum value Xm by 1.005).

For example, in the case where the geometric compression ratio ε is 12:1, when the retarded amount of intake closing CA_IVC is between 55 and 80, that is, the intake-valve close timing IVC is at ABDC 55° C.A or larger and 80° C.A or smaller (the crank angle is between 55° C.A and 80° C.A after the intake BDC), the intake retarding to compression ratio R becomes between 4.58 and 6.67, and thus, the fuel consumption rate becomes 1% or less larger than the minimum value Xm. Further, in the case where the geometric compression ratio ε is 12:1, when the retarded amount of intake closing CA_IVC is between 60 and 75, that is, the intake-valve close timing IVC is at ABDC 60° C.A or larger and 75° C.A or smaller (the crank angle is between 60° C.A and 75° C.A after the intake BDC), the intake retarding to compression ratio R becomes between 5.0 and 6.25, and thus, the fuel consumption rate becomes 0.5% or less larger than the minimum value Xm. Further, in the case where the geometric compression ratio ε is 11:1, when the retarded amount of intake closing CA_IVC is between 51 and 73, the intake retarding to compression ratio R becomes between 4.58 and 6.67, and thus, the fuel consumption rate becomes 1% or less larger than the minimum value Xm, and when the retarded amount of intake closing CA_IVC is between 55 and 68, the intake retarding to compression ratio R becomes between 5.0 and 6.25, and thus, the fuel consumption rate becomes 0.5% or less larger than the minimum value Xm.

Based on the above knowledge, in this embodiment, in order to suppress the fuel consumption rate to be 1% or less larger than the minimum value Xm, the PCM 100 controls the intake S-VT 18a in the low-speed and high-load range μl so that the intake retarding to compression ratio R becomes 5.0 or above and 6.25 or below. For example, since the geometric compression ratio ε of the cylinder 2 is set to 12:1 as described above in this embodiment, in the low-speed and high-load range μl, the PCM 100 sets the intake-valve close timing IVC to a value between ABDC 55° C.A and 80° C.A. In detail, the intake-valve close timing IVC at which the intake retarding to compression ratio R becomes 4.58 or above and 6.67 or below is set beforehand and stored in the PCM 100, and the PCM 100 controls the intake S-VT 18*a* and the exhaust S-VT 19*a* so that this timing is achieved in the low-speed and high-load range μl. For example, at an operation point where the engine speed is 1,500 rpm and the engine load is the full load within the low-speed and high-load range μl, the intake-valve open timing IVO and the intake-valve close timing IVC are set to BTDC 27° C.A (27° C.A before the exhaust TDC) and ABDC 63° C.A (63° C.A after the intake BDC), respectively, and the exhaust-valve close timing EVC is set to ATDC 27° C.A (27° C.A after the exhaust TDC).

(Operation, Etc.)

As described above, in the engine E according to this embodiment, the geometric compression ratio ε of each cylinder 2 is set to be 12:1. Moreover, the turbocharger 59 is provided to the engine E to boost intake air. Therefore, the fuel efficiency is improved while increasing the output of the engine E. However, as described above, in the engine with the high geometric compression ratio ε and provided with the turbocharger 59, preignition and knocking easily occur when the engine speed is low and the engine load is high (the low-speed and high-load range μl).

With regard to this, in this embodiment, in the low-speed and high-load range μl, the intake-valve close timing IVC is on the retarded side of the intake BDC, and the effective compression ratio of the cylinder 2 is lowered, thereby the occurrence of the preignition being suppressed. Further, as described above, since the open period of the intake valve 8 is set to be the long range of 270° C.A, the valve overlap can be achieved while the intake-valve close timing IVC is on the retarded side of the intake BDC. Moreover, by the valve overlap being provided in the low-speed and high-load range μl, the knocking in the low-speed and high-load range μl can be suppressed. Furthermore, as described above, in the low-speed and high-load range μl, the intake retarding to compression ratio R (the ratio of the retarded amount of intake closing CA_IVC with respect to the geometric compression ratio ε of the cylinder 2) is 5.0 or above and 6.25 or below, which is the value within the range where the fuel consumption rate can be 0.5% or less larger than the minimum value while knocking can be avoided. Therefore, according to this embodiment, the occurrence of abnormal combustion (e.g., preignition and knocking) can be suppressed while the fuel efficiency is securely improved.

Moreover, in this embodiment, the part of the exhaust passage 60 between the engine body 1 and the turbine 61 is comprised of the two independent exhaust passages (the first independent exhaust passage 64*a* and the second independent exhaust passage 64*b*). The first independent exhaust passage 64*a* communicates with the exhaust ports 7 of the first cylinder 2*a*, the second cylinder 2*b*, and the third cylinder 2*c* where exhaust strokes do not take place consecutively. The second independent exhaust passage 64*b* communicates with the exhaust ports 7 of the fourth cylinder 2*d*, the fifth cylinder 2*e*, and the sixth cylinder 2*f* where exhaust strokes do not take place consecutively. Therefore, an occurrence of exhaust interference can be suppressed (e.g., it is suppressed that exhaust gas discharged from a certain cylinder 2 enters into a cylinder 2 where exhaust stroke is carried out one before the certain cylinder 2, or exhaust gas discharged from the certain cylinder 2 disturbs discharging of exhaust gas from a cylinder 2 where exhaust stroke is carried out one after the certain cylinder 2). As a result, the remaining amount of burnt gas inside the cylinder 2 can be suppressed to be small, and preignition can more certainly be reduced.

Particularly, in this embodiment, the internal space of the part of the turbine housing 103 from its upstream end to the turbine body 102 is partitioned into the two inlet passages 108 (108*a* and 108*b*) which are lined up in the rotation-axis direction of the turbine body 102, and the inlet passages 108 (108*a* and 108*b*) are configured to be independent from each other over the entire circumference of the turbine body 102. Further, the first independent exhaust passage 64*a* and the second independent exhaust passage 64*b* are independently connected to the inlet passages 108 (108*a* and 108*b*), respectively. Therefore, exhaust interference and preignition can more certainly be suppressed.

In detail, the cross-sectional channel area of the turbine scroll part 105 which surrounds the turbine body 102 decreases toward the tongue part 107 at the downstream side. Therefore, a flow speed of exhaust gas introduced into the turbine scroll part 105 increases toward the tongue part 107 (i.e., the downstream end of the passage surrounding the turbine body 102), and the exhaust gas is discharged at a high speed to the turbine body 102 toward the downstream. Therefore, as described above, since the two inlet passages 108 (108*a* and 108*b*) are independent from each other over the entire circumference of the turbine body 102, exhaust gas inside each inlet passage 108 (108*a* and 108*b*) is discharged at a high speed to the turbine body 102 toward the downstream. Thereby, it can certainly be prevented that exhaust gas which passed through one inlet passage 108*a* (108*b*) and one independent exhaust passage 64*a* (64*b*) connected thereto, enters into the other inlet passage 108*b* (108*a*) and the other independent exhaust passage 64*b* (64*a*) connected thereto (i.e., the occurrence of the exhaust interference can certainly be suppressed).

(Modifications)

In this embodiment, in the low-speed and high-load range μl, the intake retarding to compression ratio R is set to be 5.0 or above and 6.25 or below. However, as described above, when the intake retarding to compression ratio R is set within a range between 4.58 and 6.67, the fuel consumption rate can be 1% or less larger than the minimum value Xm. Therefore, in the low-speed and high-load range μl, the intake valve 8 may be opened and closed so that the intake retarding to compression ratio R becomes 4.58 or above and 6.67 or below.

Moreover, in the low-speed and high-load range μl where the engine speed is below the reference speed N1 within the high-load range A where the engine load is above the given reference load T1, the intake valve 8 is closed after the intake BDC, both of the intake valve 8 and the exhaust valve 9 open for a given period of time, and the intake retarding to compression ratio R is 5.0 or above and 6.25 or below. However, this configuration may be adopted within the entire high-load range A, that is, within the entire range where the engine load is above the reference load T1 regardless of the engine speed. Further, even if this configuration is adopted only within the low-speed and high-load range μl, a concrete value of the reference speed N1 which defines the low-speed and high-load range μl is not limited to the one described above.

Further, although in this embodiment the in-head exhaust passages 17*a* and 17*b* are formed in the cylinder head 3, and the exhaust ports 7 of the cylinders 2 of which the timings of exhaust strokes are discontinuous from each other are merged inside the cylinder head 3, the exhaust ports 7 may be merged outside the cylinder head 3 and the engine body 1.

Further, although in this embodiment the geometric compression ratio ε of each cylinder 2 is 12:1, as described above, it is not limited to 12:1 as long as it is 11:1 or higher. That is, it has been apparent that preignition and knocking is likely to occur in the engine with the turbocharger when the geometric compression ratio ε of the cylinder 2 is 11:1 or higher, and the effects described above can be achieved in the engine with the geometric compression ratio ε at 11:1 or higher. Note that, from a viewpoint of practicality, an upper limit of the geometric compression ratio ε of the cylinder 2 is preferably 20:1. That is, the geometric compression ratio of the cylinder 2 is preferably 11:1 or higher and 20:1 or lower.

Moreover, although in this embodiment the open period of the intake valve 8 is 270° C.A, the valve open period may be any period as long as it is the range of 270° C.A or larger. That is, if the open period of the intake valve 8 is the range of 270° C.A or larger, in the engine with the turbocharger having the geometric compression ratio ε of the cylinder 2 at 11:1 or higher, the preignition and knocking can be prevented while the effective compression ratio of the cylinder 2 is reduced and the overlap period of the intake valve 8 and the exhaust valve 9 is secured. Note that, from a viewpoint of practicality (e.g., avoidance of interference between the intake valve 8 and the piston), an upper limit of the open period of the intake valve 8 is preferably a range of 290° C.A. That is, the open period of the intake valve 8 is preferably the range of 270° C.A or larger and 290° C.A or smaller.

Moreover, although in this embodiment six cylinders 2 are formed in the engine body 1, the number of cylinders of the engine is not limited to this. Further, the number of the independent exhaust passages is not limited to two, but two or more independent exhaust passages may be provided depending on the number of cylinders. Further, the number of the inlet passages 108 provided to the turbine 61 is also not limited to two, but any number of the inlet passages 108 may be provided depending on the number of the independent exhaust passages. Furthermore, the independent exhaust passage is configured at least not to communicate with the exhaust ports of the cylinders of which the timings of exhaust strokes are continuous to each other, and for example, a given independent exhaust passage may communicate with only the exhaust port of one cylinder.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
3 Cylinder Head
7 Exhaust Port
8 Intake Valve
18*a* Intake S-VT (Variable Phase Mechanism)
59 Turbocharger (Booster)
60 Exhaust Passage
61 Turbine
64*a* First Independent Exhaust Passage (Independent Exhaust Passage)
64*b* Second Independent Exhaust Passage (Independent Exhaust Passage)
101 Blade
102 Turbine Body
103 Turbine Housing
105 Turbine Scroll Part
108 Inlet Passage
ε Geometric Compression Ratio
CA_IVC Retarded Amount of Intake Closing
E Engine

What is claimed is:

1. An engine, comprising:
   an engine body including a cylinder provided with an intake port, an exhaust port, an intake valve, and an exhaust valve;
   an intake passage and an exhaust passage connected to the engine body;
   a turbocharger including a turbine provided to the exhaust passage and a compressor provided to the intake passage; and
   a variable phase mechanism configured to change an open timing and a close timing of the intake valve while maintaining an open period of the intake valve at a given range of 270° or larger in crank angle,
   wherein a geometric compression ratio of the cylinder is 11:1 or higher,
   wherein, in a high-load range where an engine load is above a given reference load, the variable phase mechanism sets the close timing of the intake valve to be after an intake bottom dead center and to make a ratio of a retarded amount of intake closing with respect to the geometric compression ratio of the cylinder be 4.58 or above and 6.67 or below, and sets the open timing of the intake valve to be before a close timing of the exhaust valve, the retarded amount of the intake closing being a crank angle from the intake bottom dead center to the close timing of the intake valve.

2. The engine of claim 1,
   wherein the cylinder is one of a plurality of cylinders provided to the engine body, each cylinder including a respective exhaust port,
   wherein the exhaust passage includes a plurality of independent exhaust passages, each communicating with the exhaust port of one cylinder or the exhaust ports of two or more cylinders of which timings of exhaust strokes are discontinuous from each other,
   wherein the turbine includes a turbine body having a plurality of blades configured to rotate by receiving exhaust energy, and a turbine housing configured to accommodate the turbine body,
   wherein an internal space of the turbine housing is partitioned, at a part from an upstream end of the turbine housing to the turbine body, into a plurality of inlet passages lined up in a direction of a rotation axis of the turbine body and formed to extend along an outer circumference of the turbine body, and
   wherein the plurality of independent exhaust passages are connected to different inlet passages, respectively.

3. The engine of claim 2, wherein the open period of the intake valve is a range of 270° or larger and 290° or smaller in crank angle.

4. The engine of claim 2, wherein the engine is a straight-six engine having six cylinders lined up in a row.

5. The engine of claim 1, wherein the open period of the intake valve is a range of 270° or larger and 290° or smaller in crank angle.

6. The engine of claim 5, wherein the engine is a straight-six engine having six cylinders lined up in a row.

7. The engine of claim 1, wherein the engine is a straight-six engine having six cylinders lined up in a row.

8. The engine of claim 7,
wherein an upstream part of the exhaust passage is branched into a first independent exhaust passage and a second independent exhaust passage, and a cylinder head is formed with a first in-head exhaust passage and a second in-head exhaust passage each extending in a lined-up direction of the cylinders, and
wherein, when the six cylinders include a first cylinder, a second cylinder, a third cylinder, a fourth cylinder, a fifth cylinder, and a sixth cylinder in this order from a first side to a second side in the lined-up direction:
the first in-head exhaust passage communicates with the exhaust ports of the first cylinder, the second cylinder, and the third cylinder located on the first side in the lined-up direction, and the exhaust ports of the first, the second, and the third cylinders are collected at the first in-head exhaust passage to be connected to the first independent exhaust passage, and
the second in-head exhaust passage communicates with the exhaust ports of the fourth cylinder, the fifth cylinder, and the sixth cylinder located on the second side, and the exhaust ports of the fourth, the fifth, and the sixth cylinders are collected at the second in-head exhaust passage to be connected to the second independent exhaust passage.

9. The engine of claim 8,
wherein the turbine is a twin-scroll turbine to which the first independent exhaust passage and the second independent exhaust passage are independently connected,
wherein the turbocharger is provided with a first inlet passage provided on a first side in a direction of a rotation axis of the turbine, and a second inlet passage provided on a second side, and
wherein the first independent exhaust passage is connected to the first inlet passage, and the second independent exhaust passage is connected to the second inlet passage.

10. The engine of claim 1, wherein, in the high-load range, the variable phase mechanism sets the close timing of the intake valve such that the ratio of the retarded amount of the intake closing with respect to the geometric compression ratio of the cylinder is 5.0 or above and 6.25 or below.

11. The engine of claim 10, wherein the open period of the intake valve is a range of 270° or larger and 290° or smaller in crank angle.

12. The engine of claim 10, wherein the engine is a straight-six engine having six cylinders lined up in a row.

13. The engine of claim 10,
wherein the cylinder is one of a plurality of cylinders provided to the engine body, each cylinder including a respective exhaust port,
wherein the exhaust passage includes a plurality of independent exhaust passages, each communicating with the exhaust port of one cylinder or the exhaust ports of two or more cylinders of which timings of exhaust strokes are discontinuous from each other,
wherein the turbine includes a turbine body having a plurality of blades configured to rotate by receiving exhaust energy, and a turbine housing configured to accommodate the turbine body,
wherein an internal space of the turbine housing is partitioned, at a part from an upstream end of the turbine housing to the turbine body, into a plurality of inlet passages lined up in a direction of a rotation axis of the turbine body and formed to extend along an outer circumference of the turbine body, and
wherein the plurality of independent exhaust passages are connected to different inlet passages, respectively.

14. The engine of claim 13, wherein the open period of the intake valve is a range of 270° or larger and 290° or smaller in crank angle.

15. The engine of claim 13, wherein the engine is a straight-six engine having six cylinders lined up in a row.

* * * * *